Figure 1:
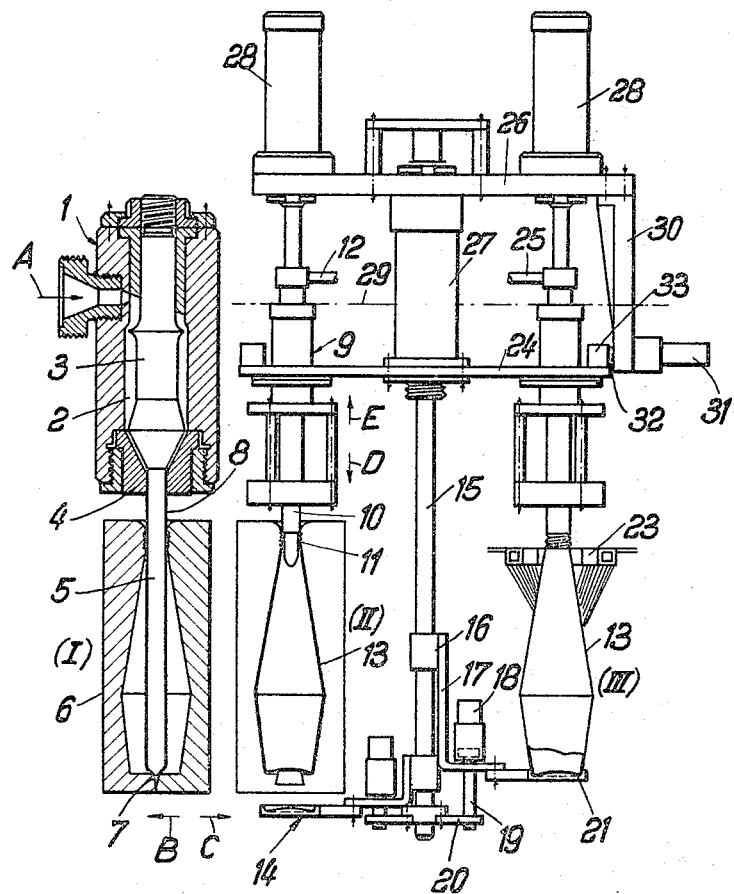

United States Patent Office 3,325,862
Patented June 20, 1967

3,325,862
BLOW MOLDING APPARATUS
Gottfried Mehnert, Lankwitzerstrasse 14–15,
Berlin, Germany
Filed Apr. 22, 1964, Ser. No. 361,758
Claims priority, application Germany, Apr. 24, 1963,
M 56,578
8 Claims. (Cl. 18—5)

The invention relates to a device for the manufacture of hollow bodies from thermoplastic by the blowing process, a tubular preform being pressed out of an extruder nozzle into a multi-part blow mold and widened into a hollow body of the desired shape by means of a pressure medium in the blow mold, the time for which the hollow body has to remain in the blow mold in order to become consolidated being reduced to the minimum possible period, the process thus providing increased output and a saving of cost in the production of hollow bodies of this kind.

It is well known that the hollow body shaped from a plasticized preform by means of a pressure medium in the blow mold is by no means consolidated immediately after the forming operation. The slow transition from the completely plastic to the completely firm state in the case of a hollow body open at one end, such as a bottle, does not take place evenly over the width and length of the body, but depends on the quantity of material, on the particular cross section of the material and also on what part of the hollow body has been shaped from the piece of tubing which has already been outside the pressure nozzle for a longer time and what part of it has been formed with the piece of tubing which has not been outside the pressure nozzle for so long, i.e. in the case of an apparatus with a pressure nozzle and a blow mold standing vertically one above the other, what part of the hollow body has been formed from the lower part of the preform and what part from the upper piece of the preform. It is also known that, in the case of bottles, for example, the floor and the neck remain deformable for longer than the rest of the body.

The problem was therefore to provide a device in which these known circumstances would be taken into account and which would nevertheless render it unnecessary to leave the blown material in the blow mold longer than necessary for the process of shaping it to be completed.

A device is already known for the production of hollow bodies open at one end, such as bottles, in which device the blowing material, which projects into the closed blow mold and introduces the blowing medium and shapes the hollow body, is removed from the zone of the mold after the completion of the shaping process, with the bottle upside down on top of it, in order to leave room for a further blowing operation, while the hollow body, standing on the blowing mandrel, is given a chance to cool down completely and to set. This known device suffers from a number of drawbacks, among them being th fact that the hollow body, which is standing upside down and of which only the filling neck is positioned on the mandrel projecting into the said neck, is inclined to tilt, particularly if it is heavy or long, and this, for the reasons already mentioned, may result in permanent deformation. Neither can this drawback be avoided when the mandrel is allowed to project to a considerable distance into the hollow body, or even when it is provided with a collar for the end surface of the neck of the bottle to rest on. This drawback is particularly noticeable in the case of an apparatus operating with a rotatable mandrel head with a horizontal axis, i.e. a rotating head which, during the blowing operation, projects vertically into the mold from below and which, after the blowing operation and the opening up of the mold parts, is rotated, with the bottle mounted on it, into the horizontal position.

All these known devices also have in common the disadvantage that the hollow bodies cannot be filled and sealed in the same plant without extra expenditure on apparatus.

The invention enables the aforementioned disadvantages to be avoided and relates to an apparatus for the manufacture of hollow bodies from a tubular or bladder-shaped preform of thermoplastic, this preform being blown up into its final shape in a multi-part mold by means of a blowing mandrel introduced from the outside, being removed from the mold together with the blowing mandrel before it finally sets and being finally consolidated outside the mold without being separated from the blowing mandrel. The device is characterised by the fact that each blowing mandrel is provided with a support which can be raised and lowered in the axis of the blowing mandrel and which embraces that surface of the hollow body removed from the mold which is situated opposite the blowing mandrel.

In FIG. 1, 1 is the so-called extruder head of the tube-forming station, into which the material, plasticized by an extruder, enters at A, accumulates around the punch 3 and emerges through the ring nozzle 4 as the preform, in the shape of a plastic tube 5. Here the preform, after it has been expelled from the nozzle 4 to a sufficient length, i.e. a length corresponding to the height of the body to be blown, is taken up by the multi-part mold which is movable, i.e. can be opened and closed, in the direction B–C shown by the arrow. In other words, the portions of the mold, usually halves, moved apart, are brought into position under the nozzle 4 by the distance necessary to ensure that the preform is suspended between them, after which they are brought together, in which process, as shown at 7, they close the end of the preform, position I, and are then moved back in the direction C, shown by the arrow, in which process they separate the other end 8 of the preform from the beginning, suspended on the nozzle, of the subsequent preform.

When the now closed mold, with the preform suspended in it, has reached position II, it is situated underneath the blowing station, which is generally marked 9 and of which the blowing mandrel 10, which can be raised and lowered in the direction D–E shown by the arrow, is pushed downwards and thrust into the open end of the preform, in which process it shapes the said end into the filling aperture 11 of the hollow body. At the same time air is introduced as blowing medium through the conduit 12, and this air shapes the preform into the bottle 13 by causing it to rest against the internal walls of the mold. After the blowing medium has been introduced through the blowing and forming mandrel 10 and the hollow body 13 has been given its shape, the mold 6 is opened again and returned to position I.

This makes it unnecessary for the hollow body to remain in the mold for more than a very short time; in other words, it makes it possible to speed up the cycle of the movement of the mold from position II to position I and vice versa. This is rendered possible by the fact that the hollow body 13, on which the blowing process is terminated but which is not yet completely consolidated, is not entirely deprived of its support, even after the elimination of the surface-supporting blow mold, but extends into another and simpler support suitable for the purpose. The hollow body can then cool down and solidify outside the blow mold, with or without the use of an additional auxiliary cooling system, without any danger of deformation.

For this purpose the invention provides for each blowing mandrel a supporting device 14, which can be raised and lowered and which is situated in the axis of the mandrel and which, after the opening of the blow mold 6, is brought up to that surface of the blown hollow body which is opposite the blowing mandrel, supporting and centring the hollow body and removing it from the blowing position II. The mandrel 10 can remain in the blowing position during this time and be moved together with the supporting device 14. This ensures that the hollow body, on which the blowing process has been completed but which is not yet fully solidified and is therefore still exposed to the danger of deformation, is properly secured but nevertheless subjected to the cooling action of the surrounding atmosphere.

In the embodiment of the invention shown in FIG. 1, a number of blowing stations 9 and supporting devices 14 are provided for this purpose and are rotatable about a vertical shaft 15, which at the same time serves as a guide for the sleeves 16, which are displaceable in the direction E–D shown by the arrow. To the sleeves are attached angles 17, on the horizontal members of which is provided a periodically controlled piston mechanism 18, of which the piston rod 19 is affixed to a disc, spider or similar device 20, which can be rotated about the shaft 15 but which is vertically fixed. This results in the raising or lowering of the mounting support 21, which in the example illustrated takes the form of a dish but which can naturally consist alternatively of a borer, bowl or simple part-mold, which may be of sheet metal.

Figure 2:
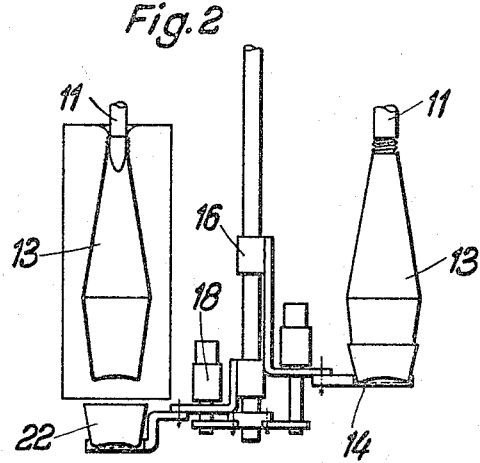

If, as shown schematically in FIG. 2 by way of an example, the support generally marked 14, in accordance with the external shape of the blown hollow body, takes the form of a bowl 22 which embraces a major part of the external surface of the hollow body, then according to the size and shape of the hollow body, which determine the tilting angle, it may also be unnecessary, during the transport from blowing station II to setting station III, to leave the blowing mandrel 10, as an additional securing and centring device, inside the hollow body. This possibility obviously simplifies the construction of the plant as a whole, and it enables the cycle of stroke to be accelerated still further. The design is simplified because one blowing mandrel and all the devices required for its action are sufficient, and the number of strokes per unit of time can be increased because the blowing mandrel can be removed from the hollow body before the latter leaves the blowing station II and is thus left in readiness for the action of introducing air by entering the tubular preform when the mold with the preform has been moved from station I to station II.

To accelerate the cooling and thus the consolidation of the hollow body, which had not yet completely set when it was taken from the mold, an air or water spray 23 can be provided at a suitable point, and in the example illustrated this must naturally not be constructed as a solid ring. As the air and water spray 23 acts not only on the hollow body 13 but also on the dish 21 or bowl 22, and as, in the subsequent stroke, this support, thus cooled, is brought up to the hollow body, which has just emerged from the mold, its cooling and consolidation can be accelerated still further, and it will be immediately obvious that this action is the more effective the greater the contact surface of the support.

Figure 3:
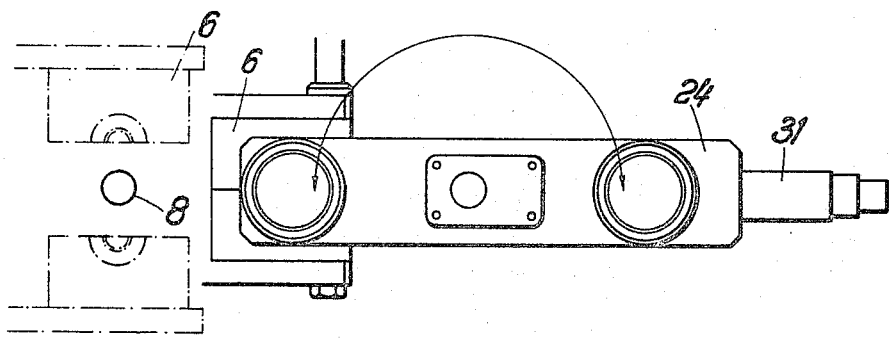

The blowing stations 9 are preferably affixed to a beam, cross or disc 24 which is connected with the central shaft 15, as shown in FIGS. 1 and 3. Now if two blowing stations belong to one and the same apparatus, a beam 24, rhythmically pivoted through an angle of 180°, will be sufficient as a supporting device, while in the case of several blowing stations a spider or disc will be used as a supporting device, performing a further rotation through a ceratin angle, at a certain rhythm, according to the number of stations affixed to it. Needless to say, both the blowing stations 9 and the supports 14 can be mounted on other suitable supporting and actuating devices, such as chains moving over sprocket wheels or the like.

In the embodiment of the invention shown in FIG. 1, it is also possible for the setting station, or, if the hollow body removed from the mold passes through a number of stations, for one of these, preferably the last one, to be constructed as a filling station. It is preferably possible for the blowing mandrel to be utilised as a filling device in this connection and for the filling material to be introduced into the bottle or other body through the conduit 25, for example.

26 is a stationary frame, traverse or similar device, to which are attached the actuating device 27 for the central shaft 15 and the actuating devices 28 for the blowing and/or filling stations. The separation between the movable and the rigid parts is preferably effected along the line 29. 30 is a bracket to which is attached a retaining device 31, which may, for example, be situated in a cylinder with a piston, of which the piston rod 32 snaps into the opening of a block 25 affixed to the disc 24, in order to ensure that in the blowing position and in the setting position in each case the movable and the stationary parts are positioned in relation to one another in such a way as to operate correctly.

This apparatus enables the time for which a blown hollow body such as a bottle remains in the blow mold to be determined independently of the setting time of the hollow body, and the hollow body to be removed from the mold at a far earlier stage, thus releasing the mold for a further blowing cycle, without involving the risk of possible deformations in the hollow body which has been removed from the mold in an as yet incompletely consolidated state. It also makes it possible for the cooling and thus the setting of the hollow body outside the mold to be considerably accelerated, and finally it renders it possible for a hollow body to be shaped from thermoplastic and to be consolidated and filled in one and the same apparatus.

I claim:

1. A blow-molding apparatus comprising, in combination, a single multi-section mold movable between a first and a second position and adapted to open and close in each of said positions; means for introducing a preform of thermoplastic material into said mold at said first position thereof; a mandrel movable into said preform in said mold in said second position thereof for blowing a gas into said preform so as to expand the latter into an article of desired size and shape prior to opening of said mold in said second position; and support means movable into engagement with a portion of said article spaced from the point of entry of said mandrel subsequent to opening of said mold in said second position and prior to complete setting of said article.

2. Apparatus as defined in claim 1, wherein said support means is shaped to conform to the contour of said part of said article.

3. Apparatus as defined in claim 1; and further comprising conveying means for conveying said support means in an endless path for moving said article supported by said support means to at least one treating station.

4. Apparatus as defined in claim 3; and further comprising cooling means positioned at said one treating station for directing a cooling fluid against said article to thereby facilitate setting of the latter.

5. Apparatus as defined in claim 3, wherein said conveying means comprises a rotary shaft, and a carrier rigid with said shaft for rotation therewith, said support means comprising at least one support member carried by said support for movement in said endless path.

6. Apparatus as defined in claim 5, wherein said support member is normally positioned at a level below said mold when the latter is in said second position thereof; and further comprising means for raising said support member into engagement with said part of said article.

7. Apparatus as defined in claim 3; and further comprising at least one additional mandrel, said mandrels being movable in an endless path between said second position of said mold and said one treating station and being arranged for movement with the respective article into which they extend.

8. Apparatus as defined in claim 7; and further comprising filling means positioned at an additional processing station arranged downstream of said one processing station and operatively connectable with the respective mandrel carried by the respective article for introducing a flowable mass into the latter through the former.

References Cited

UNITED STATES PATENTS

| 2,094,626 | 10/1937 | Tremblay | 65—264 XR |
| 2,260,750 | 10/1941 | Kopitke | 264—98 |
| 2,952,034 | 9/1960 | Fortner | 264—99 |

WILLIAM J. STEPHENSON, *Primary Examiner.*

W. L. McBAY, *Examiner.*